United States Patent

[11] 3,613,072

| [72] | Inventors | Robert Desbrandes<br>Sevres;<br>Francisque Lebreton, Paris Viieme; Pierre Morlier, Paris Viieme; Jean Paul Sarda, Rueil Malmaison, all of France |
|---|---|---|
| [21] | Appl. No. | 843,115 |
| [22] | Filed | July 18, 1969 |
| [45] | Patented | Oct. 12, 1971 |
| [73] | Assignee | Institut Francais du Petrole des Carburants et Lubrifiants<br>Rueil-Malmaison, France |
| [32] | Priority | Apr. 22, 1968 |
| [33] | | France |
| [31] | | 160.168 |

[54] METHOD AND APPARATUS TO EFFECT SUBSTANTIALLY POINTWISE MEASUREMENTS OF THE CHARACTERISTICS OF THE GROUND LAYERS TRAVERSED BY BOREHOLE
9 Claims, 1 Drawing Fig.

[52] U.S. Cl. .................................................... 340/18 DC
[51] Int. Cl. ....................................................... G01v 1/40
[50] Field of Search ............................................ 340/18 DR

[56] References Cited
UNITED STATES PATENTS
2,436,503   2/1948   Cleveland....................   340/18

*Primary Examiner*—Rodney D. Bennett, Jr.
*Assistant Examiner*—Daniel C. Kaufman
*Attorney*—Craig, Antonelli and Hill ABSTRACT: A method and apparatus to effect measurements, substantially pointwise, of the characteristics of ground layers traversed by a borehole, according to which one determines the product of the value of the first derivative of the parameter, in terms of its average values for successive intervals, with respect to each measurement level, by the height of the measurement interval, and in which one deduces the local values of the parameter at different levels of the ground surrounding the sonde with the aid of the numerical value of such product.

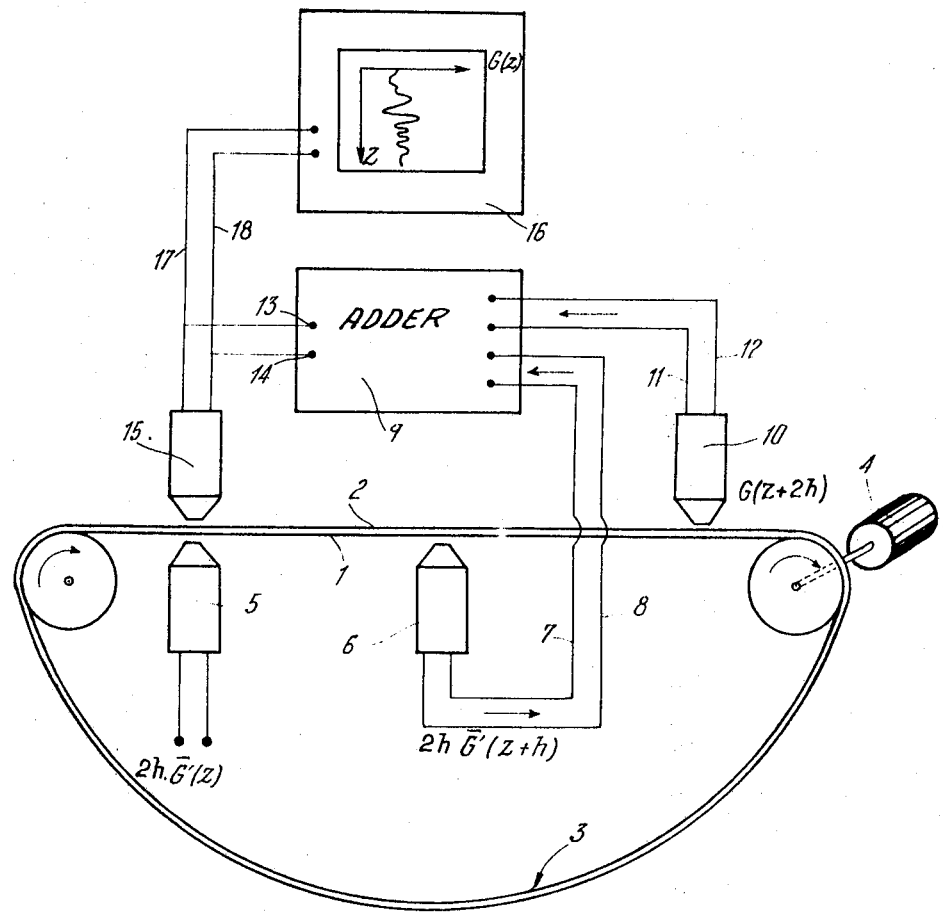
INVENTORS
ROBERT DESBRANDES, FRANCISQUE LEBRETON,
PIERRE MORLIER and JEAN PAUL SARDA
BY Craig, Antonelli, Stewart & Hill
ATTORNEYS

METHOD AND APPARATUS TO EFFECT SUBSTANTIALLY POINTWISE MEASUREMENTS OF THE CHARACTERISTICS OF THE GROUND LAYERS TRAVERSED BY BOREHOLE

The present invention relates to a method and apparatus to effect substantially point-wise measurements of characteristics of the ground layers traversed by a borehole, with a view to determine with precision the existence and nature of a certain number of geological discontinuities due, particularly, to changes in lithology and to the presence of fractures.

There exists at present a certain number of well logging methods based for example, on measurements of a physical parameter of the earth, such as its electrical resistivity or the velocity of propagation of acoustic waves in the ground, whose purpose is to determine the average value of the considered parameter, between two levels of the borehole.

The object of the present invention is to provide a method permitting, from such average values of a physical parameter of the ground in proximity to the borehole, established for successive measurement intervals of the same height along the borehole, each of these average values being related to an average level of depth of the corresponding measurement interval, to establish a log representing as a function of the depth, the local values of this parameter.

The result is obtained, according to the present invention, by determining for each measurement level, the product of the value of the first derivative of the parameter with respect to the measurement level by the height of the measurement interval, this product being substantially equal to the difference between the difference between the respective local values of the considered parameter at the two levels delimiting the measurement interval on both sides of the measurement level.

In this manner one may, in increments, determine by recurrence the local value of the considered parameter in the terrains or formations surrounding the borehole, at different levels thereof.

The physical value characterizing the layers of the ground, may be their electrical resistivity or still the velocity of propagation of acoustic waves in the layers of the terrain, these two examples being, however without any limitative character. The measurement of this physical value may be realized by utilizing any known devices, forming no part of the present invention.

An advantageous mode of realization of an apparatus to carry out the method according to the present invention, from indications of a well logging sonde, comprises means for unwinding or displacing at a speed proportional to the speed of displacement of the sonde in the well, a recording tape having two tracks, such as, for example, a magnetic tape, means for recording on the first one of these tracks the product of the parameter, measured with respect to the first derivative of the parameter, measured with respect to the average measurement level, by the height of the measurement interval, readout means associated with the first track for reading out the value of said product, located at a distance from the recording means, corresponding on the scale of the tape, to one-half the measurement interval, the readout means being adapted to deliver a first electrical signal proportional to the read value of the said product, readout means associated with the second track, located on the same side as the readout means associated with the first track with respect to the recording means in the direction of movement of the tape but at twice the distance of the first readout means, the readout means of the second track being adapted to deliver a second electrical signal proportional to the read value of the intensity of a signal recorded on the second track, adding means connected to said two readout means, respectively, and adapted to produce at the output terminals thereof a resultant signal equal to the algebraic sum of said first and of said second electrical signal, and means for recording said resultant signal on the second track of the tape, connected to the output terminals of the adding means and having the same abscissa along the tape as said recording means along the first track, said resultant signal being representative of the local value of the measured parameter, at the same level of the borehole as the said average measurement level.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic, diagrammatic view of one apparatus in accordance with the present invention.

The physical value G, characteristic of the ground, the average value $\bar{G}$ of which is measured along the borehole for successive ground strata of a height $2h$ will be for example, the electrical resistivity or the velocity of propagation of acoustic waves in the ground.

In the first case the measurements may be made by means of a sonde of conventional usual type injecting into the ground an electric current by means of a transmitter electrode, this current passing through a circuit path closed in the ground at a point remote from the sonde.

The difference of potential appearing between two measurement electrodes of the sonde separated by the distance $2h$ will be as a first approximation, proportional to the average resistivity $\bar{R}$ of the layer of the ground located in the interval between the two measurement electrodes.

In another usual sonde type adapted to induct in the ground electric alternating currents, the measurement electrodes are replaced by two induction coils spaced at a distance $2h$.

The sonde may also be a conventional acoustic sonde comprising an acoustic transmitter and an acoustic receiver located at levels spaced at the distance $2h$ from each other. The measured physical value will then be the time of propagation $\Delta_t$ of the acoustic waves between the transmitter and the receiver, inversely proportional to the velocity of propagation $V$ of the acoustic waves in the geological formation located at the level of the sonde.

Whatever the physical value $G(z)$ representative of a physical parameter of the ground, the average value $\bar{G}(z)$ of which is measured between the level of the transmitter device of the sonde and that of its receiver, $\bar{G}(z) = \Delta_{t(z)}$ or $\bar{G}(z) = \bar{R}(z)$, $z$ being the level of a reference point of the sonde which is assumed to be equidistant from the transmitter and from the receiver, one obtains for each value $z_n$ of $z$ $$G(z_n) = \frac{1}{2h} \int_{z_n+h}^{z_n-h} G(z) dz$$

By differentiating with respect to $z$ the function $\bar{G}(z)$ one obtains:

$$2h \, \bar{G}'(z) = G(z+h) - G(z-h)$$

or $$G(z) = G(z+2h) + 2h\bar{G}'(z+h)$$

This equation is utilized in the method according to the present invention to determine by recurrence the local physical value of $G(z)$ at each point, knowing its average value $\bar{G}'(z)$ for the layers comprised between the levels $z-h$ and $z+h$ and its local value $G(z+2h)$ at a level spaced at a distance of $2h$ from the considered point.

Referring now to the single FIGURE of the drawing, reference numeral 3 generally designates therein a magnetic recording tape having two tracks 1 and 2, which is displaced by an electric motor 4 whose rotation is controlled in a known conventional manner by the displacement of the sonde (not shown) in the well, (this displacement being usually effected in the sense of a rise or upward movement of the sonde). The arrows in the drawing indicate the direction of movement of the tape.

Reference numeral 5 designates a conventional recording-erasing means of any known type which receives an electric signal the intensity of which is proportional to $2h \, \bar{G}'(z)$, which may be obtained in a very simple manner by means of an electronic differentiating device (not shown) of any conventional, known construction, receiving after amplification, the electrical signal produced by the receiver of the sonde, this signal representing the average value $\overline{G}(z)$ as defined above.

A readout means 6, again of conventional construction, located at a distance from the recording means 5 corresponding, on the scale of the tape 3, to the distance $h$ (one-half of the interval between the transmitter of the sonde and the receiver) reads the recording effected by the recording head 5 on the track 1 of the tape 3 and therefore provides an electrical signal proportional to $2h\,\overline{G'}(z+h)$.

This signal is applied to a first input of an algebraic adding means 9 of any conventional construction, by way of conductors 7 and 8.

A second readout means 10 of conventional construction, located on the same side as the readout means 6 with respect to the recording means 5, but at twice the distance (corresponding to $2h$ on the scale of the tape), produces a signal proportional to the value which is read from the second track 2 of the tape 3.

This signal is applied to the second input of the algebraic adding means 9 by the means of conductors 11 and 12. The output terminal 13 and 14 of the algebraic adding means 9 are connected to a recording-erasing means 15, of conventional construction, which is disposed exactly opposite the recording-erasing means 5, i.e. at the same abscissa along the magnetic tape 3. Under these conditions, the recording means 15 impresses on the track 2 of the magnetic tape 3 a signal $G(z)$ which is the algebraic sum of the signals provided by the readout heads 6 and 10, that is such that:

$$G(z) = 2\,\overline{G'}(z+h) + G(z+2h)$$

According to the equation described above, this signal therefore represents, except for a constant, (which is easy to calculate on the basis of the measurement effected at a position of the sonde at the level of a geological layer of known characteristics, for example, of a layer near the surface of the earth), the local value at each level (and no longer only the average value) of the physical parameter surveyed (electrical resistivity, velocity of propagation of acoustic waves, etc.).

It is understood that the operation of the illustrated device assumes that the function $G(z)$ is known at the beginning of the recording by the recording means 15, for a ground thickness at least equal to $2h$. It suffices for that purpose to estimate the value of $G(z)$ over a sufficient interval for which there is no variation of the average measured value $\overline{G}(z)$ (which then results in $\overline{G'}(z)=0$ corresponding to the traversal of a homogeneous layer of a thickness at least equal to $2h$).

The resulting estimation will give a margin of uncertainty as to the local values $G(z)$ obtained for the different levels of the sonde in the well.

However, the aforementioned recurrence formula indicates that the absolute error of $G(z)$ will be the same for all the levels of the sonde. It will therefore be easy to eliminate the same by determining for a geological layer of known characteristics, for example, adjacent or near the surface of the ground, the difference between the real value of G and the value obtained by use of the method according to the present invention.

The electrical signal representative of $G(z)$ appearing at the terminals 13 and 14 of the algebraic adding means 9 may be applied to a recording device 16, of conventional construction, by way of conductors 17 and 18. This device includes for example a tape of paper, whose movement is controlled by the displacement of the sonde in the well, which permits a direct reading of the local values $G(z)$ in the well at different depths.

While we have shown and described only one embodiment in accordance with the present invention, it is understood that the same is not limited thereto but is susceptible of numerous changes and modifications as known to persons skilled in the art, and we therefore do not wish to be limited to the details shown and described herein but intend to cover all such changes and modifications as are within the scope of those skilled in the art.

We claim:

1. A method for determining the local values of a physical parameter of the ground, at different levels of a borehole from average values of this parameter corresponding to successive measurement intervals of the same height along the borehole, wherein each of said measurement intervals is limited by first and second levels of the borehole each of these average values being related to an average level of the measurement interval, in combination with an automatic data processing system, the method comprising determining for each measurement level the product of the value of the first derivative of the parameter, with respect to the measurement level and the height of the measurement interval, this product being substantially equal to the difference between the respective local values of the considered parameter at said first and second levels respectively, thus enabling the local values of the parameter at different levels of the borehole to be obtained by recurrence, one local value of this parameter being known.

2. A method according to claim 1, wherein the physical parameter of the ground is its electrical resistivity.

3. A method according to claim 1, wherein the physical parameter is the velocity of propagation of acoustic waves in the ground.

4. An apparatus for determining the local values of a physical parameter of the earth at different levels of a borehole, comprising means for displacing a recording tape means at a velocity proportional to the velocity of displacement in a borehole of a sonde means for measuring said parameter, said recording tape means having two tracks, first recording means associated with one track for recording the product of the first derivative of the measured parameter, with respect to the average measurement level and the height of the measurement interval, first readout means for reading out the value of said product along said first track, located at a distance from the first recording means corresponding, on a scale of the tape means, to half said measurement interval, said first readout means being adapted to produce a first electrical signal proportional to the read value of said product, second readout means associated with said second track and located on the same side as said first readout means with respect to said first recording means in the direction of displacement of said tape means but at twice the distance therefrom of said first recording means, said second readout means being adapted to provide a second electrical signal proportional to the read value of the intensity of a signal recorded on the second track, adding means connected with said first and said second readout means, respectively, and adapted to produce at its output terminals a resultant signal equal to the algebraic sum of said first and second electrical signals, and means for recording said resultant signal in said second track, connected to the output terminals of said adding means and having substantially the same abscissa along the tape means as the first recording means, the resultant signal being representative of the local value of the measured parameter, at the same level of the borehole as said average measurement level.

5. An apparatus according to claim 4, wherein said product is equal to $2hG'(z)$, the signal read by said first readout means is equal to $2hG'(z+h)$, where $2h$ is the height of the measurement interval and $z$ is the level of a reference point of the sonde, and the signal read by said second readout means is equal to $G(z+2h)$.

6. An apparatus according to claim 4, further comprising recording means connected to the output of said adding means for directly reading out the local values at different depths of the borehole.

7. A method for determining the local values of a physical parameter of the ground at different levels of depth of a borehole from a series of electrical signals representing the average values of this parameter for successive measurement intervals of the same height along the borehole, wherein each of said measurement intervals is limited by first and second levels of the borehole and each of said average values is related to an average level of the measurement level comprising, producing a recurrence electrical signal representing the product formed by multiplication of the first derivative, with respect to the measurement level, of the electrical signal related to said level in said series, and the height of the measurement interval, and recording said recurrence electrical signal being a function of the difference between the local values of the considered parameter at different levels respectively, and recording said recurrence electrical signal versus depth, whereby the local values of the parameter at different levels of depth of the borehole can be obtained by recurrence from a single known local value of this parameter.

8. A method according to claim 7, wherein said physical parameter is the electrical resistivity of the ground.

9. A method according to claim 7, wherein said physical parameter is the velocity of propagation of acoustic waves in the ground.

UNITED STATES PATENT OFFICE
CERTIFICATE OF CORRECTION

Patent No. 3,613,072           Dated October 12, 1971

Inventor(s) Robert DESBRANDES et al

It is certified that error appears in the above-identified patent and that said Letters Patent are hereby corrected as shown below:

Column 5, line 4, which now reads:

"ment interval, and recording said recurrence
electrical signal"

should read as follows:

--ment interval, said recurrence electrical signal--

Signed and sealed this 13th day of June 1972.

(SEAL)
Attest:

EDWARD M. FLETCHER, JR.          ROBERT GOTTSCHALK
Attesting Officer                 Commissioner of Patents